(12) United States Patent
Shiau et al.

(10) Patent No.: US 7,438,445 B2
(45) Date of Patent: Oct. 21, 2008

(54) SIDE-EMITTING LIGHT-EMITTING ELEMENT AND PACKAGING LENS THEREOF

(75) Inventors: Tzeng-Ke Shiau, Miao-Li Country (TW); Wen-Bin Chou, Miao-Li Country (TW); Teng-Chao Hou, Miao-Li Country (TW)

(73) Assignee: Coretronic Corporation, Chu-Nan, Miao-Li County (TW)

( * ) Notice: Subject to any disclaimer, the term of this patent is extended or adjusted under 35 U.S.C. 154(b) by 69 days.

(21) Appl. No.: 11/486,071

(22) Filed: Jul. 14, 2006

(65) Prior Publication Data

US 2008/0013325 A1    Jan. 17, 2008

(51) Int. Cl.
*F21V 5/00* (2006.01)
(52) U.S. Cl. .................... 362/333; 362/337; 362/331; 362/326
(58) Field of Classification Search .......... 362/307–310
See application file for complete search history.

(56) References Cited

U.S. PATENT DOCUMENTS

| 6,598,998 | B2 | 7/2003 | West et al. |
| 6,679,621 | B2 | 1/2004 | West et al. |
| 2004/0141323 | A1 | 7/2004 | Aynie et al. |

*Primary Examiner*—Anabel M Ton
(74) *Attorney, Agent, or Firm*—Muncy, Geissler, Olds & Lowe PLLC

(57) ABSTRACT

A side-emitting light-emitting element and a packaging lens thereof, wherein the packaging lens comprises an incident surface, a reflective surface, a first refractive surface, and a second refractive surface. The first refractive surface has zigzag surfaces. After a light from a light source enters into the packaging lens through the incident surface, a portion of the light is reflected by the reflective surface to the first refractive surface via total internal reflection to vertically penetrate the first refractive surface and then proceeds along a first optical path. The other portion of the light is refracted by the second refractive surface to penetrate the second refractive surface and then proceeds along a second optical path, which is parallel to the first optical path. A zigzag surface of the first refractive surface avoids from undesired lights reflected by the first refractive surface.

13 Claims, 6 Drawing Sheets

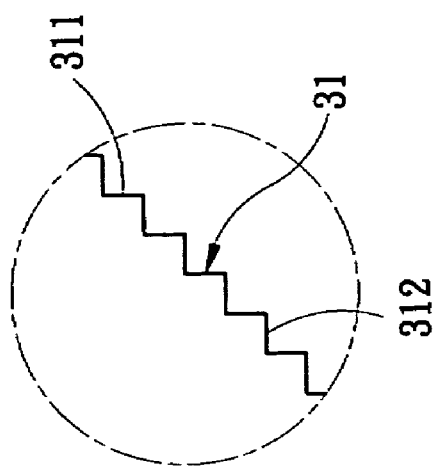
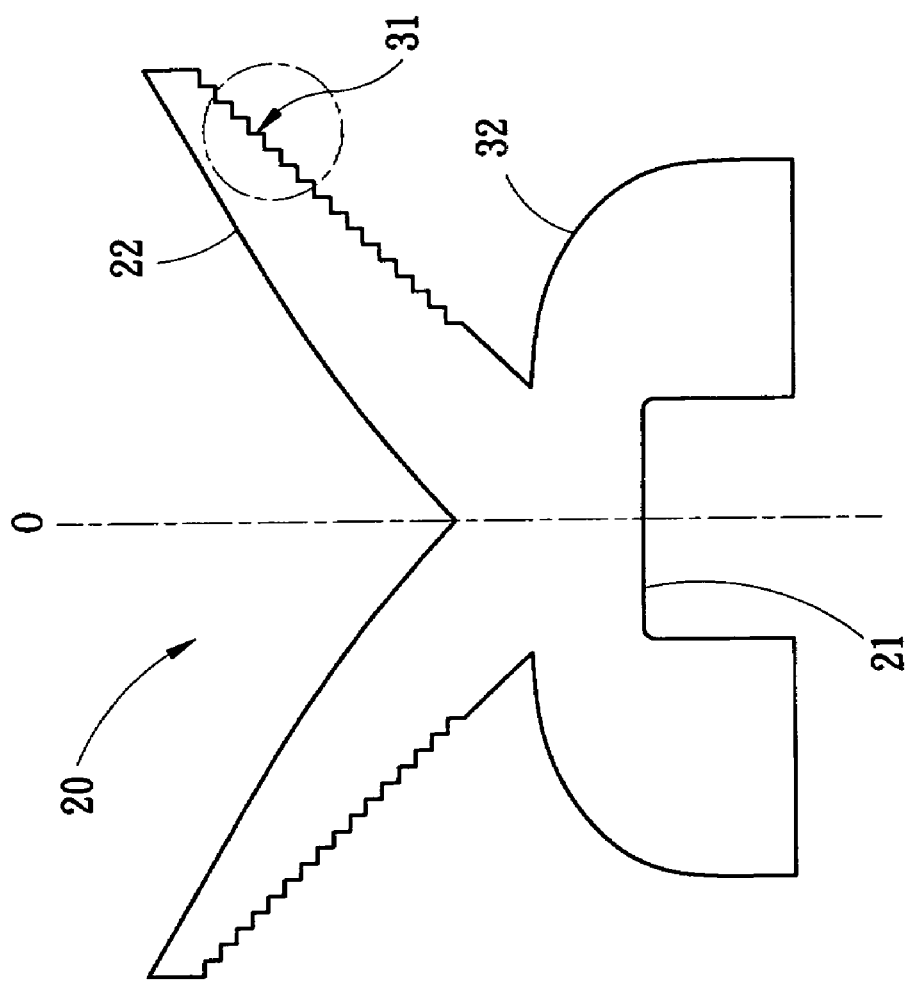
Fig.4A
Fig.4B

SIDE-EMITTING LIGHT-EMITTING ELEMENT AND PACKAGING LENS THEREOF

FIELD OF THE INVENTION

The present invention relates to a light-emitting element, particularly to a side-emitting light-emitting element and a packaging lens thereof.

BACKGROUND OF THE INVENTION

As shown in FIG. 1A, a light-emitting path of conventional light-emitting elements, such as the light-emitting diode (LED) 15, is perpendicular to a light-emitting surface of the light-emitting elements, and the energy distribution thereof is Lambert's type. The conventional light-emitting elements are usually applied to traffic signals, illuminators or other guide signs. However, as shown in FIG. 1B, when multiple LEDs 15 and 15' are arranged together to mix optical properties, such as mixing light intensity or light color. The mixing effect can be obtained at a given distance away from the light-emitting surface. An invalid distance D1 is the given distance where the mixing effect does not appear. If the light distribution pattern of the emitted light can be flattened, the invalid distance D1 will be shortened obviously.

As shown in FIG. 2, a conventional side-emitting light-emitting diode of U.S. Pat. No. 6,598,998 B2, entitled "Side Emitting Light Emitting Device" issued to Lumileds Co., discloses a side-emitting light-emitting diode having a special packaging lens. Such kind of side-emitting light-emitting diode has multiple refractive surfaces 14, which have an oblique angle with respect to an optical axis L of the packaging lens. Although most light energy passes through the refractive surfaces 14 which the side surface of the packaging lens and is emitted therefrom, a small portion of light energy (less than 10%) still is emitted from the top of the packaging lens (i.e. along the direction of the optical axis L). Therefore, a light-shield sheet is stuck onto the top of the packaging lens of this kind of side-emitting light-emitting diode to reflect back the light proceeding upward.

Refer to FIG. 3. U.S. Pat. No. 6,679,621 B2, entitled "Side Emitting LED and lens", issued to the abovementioned Lumileds Co. discloses another packaging lens as shown in FIG. 3. The packaging lens comprises an incident surface 10, a reflective surface 11, a first refractive surface 12 and a second refractive surface 13. After a light from a light source enters into the packaging structure through the incident surface 10, the light proceeds primarily along two paths P1, P2 and is emitted out thereby. The light enters into the packaging structure through the incident surface 10 to be reflected by the reflective surface 11 via total internal reflection then to penetrate the first refractive surface 12 along the path P1. The light enters into the packaging structure through the incident surface 10 and then to penetrate the second refractive surface 13 directly along the path P2. However, the abovementioned conventional technology has the following problems.

First, when the light reflected by the reflective surface 11 is not incident the first refractive surface 12 in an incident angle with a right angle, and it results in the energy loss; further, when the incident angle is too great it brings about a total reflection.

Second, a portion of the light reflected by the first refractive 12 penetrates the reflective surface 11 and forms light spots or light halos on LED. This results in the light energy loss and an undesired light distribution pattern and needs a shielding sheet or a diffusive sheet.

Third, an intersection formed by the reflective face 11 and the first refractive face 12 is an acute angle to result in a fragile structure of the packaging lens.

SUMMARY OF THE INVENTION

A side-emitting light-emitting element and a packaging lens thereof according to the present invention reduce the light loss occurring in a refractive surface and avoid that the total reflection resulting from a too large incident angle.

In a preferred embodiment of a side-emitting light-emitting element and a packaging lens thereof according to the present invention, a first refractive surface has a zigzag surface, and a light reflected by the reflective surface vertically penetrates the first refractive surface along a first optical path. Thereby, the light loss and the reflection occurring in the refractive surface can be reduced.

In a side-emitting light-emitting element and a packaging lens thereof according to the present invention, a first refractive surface has a zigzag surface, which can enhance structure strength of an intersection formed by a reflective surface and a first refractive surface so that a fragile structure of the packaging lens can be avoided.

BRIEF DESCRIPTION OF THE DRAWINGS

FIG. 4A is a diagram of a preferred embodiment of a packaging lens structure according to the present invention.

FIG. 4B is a partial view of FIG. 4A.

DETAILED DESCRIPTION OF THE PREFERRED EMBODIMENTS

Figure 1A:
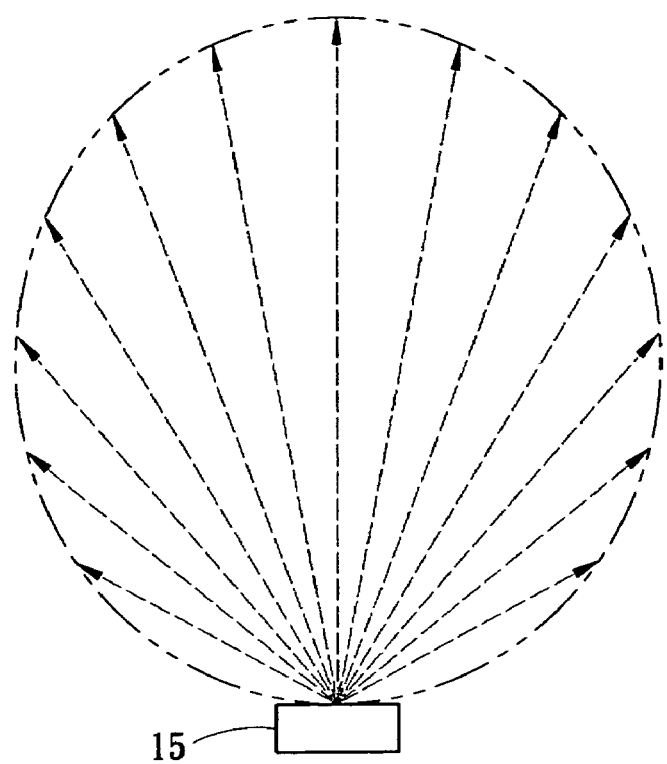
FIG. 1A is a diagram of the light distribution pattern of a conventional LED chip.
Figure 1B:
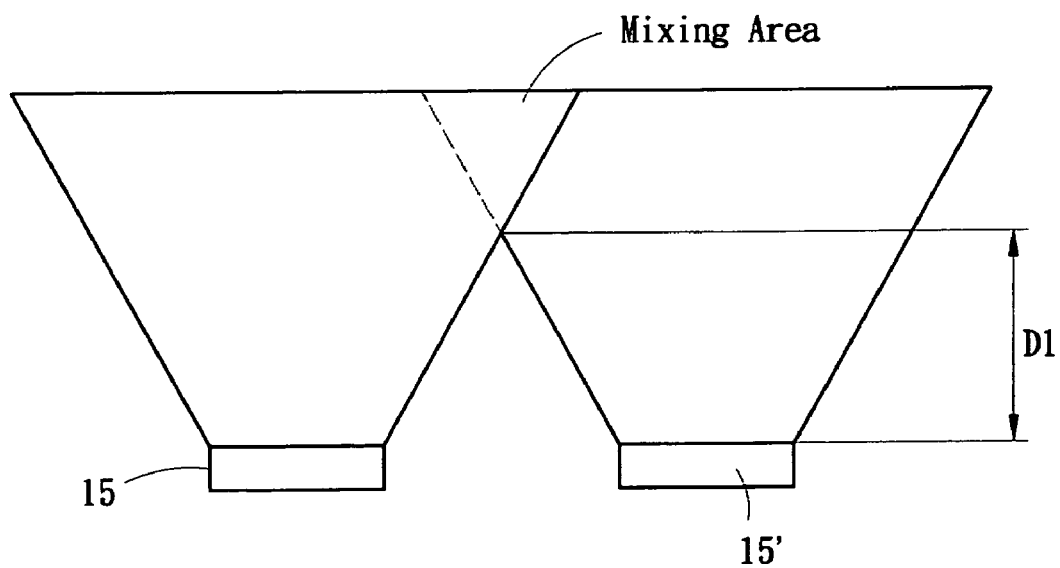
FIG. 1B is a diagram showing the light distribution in mixing optical properties of multiple conventional LEDs.
Figure 2:
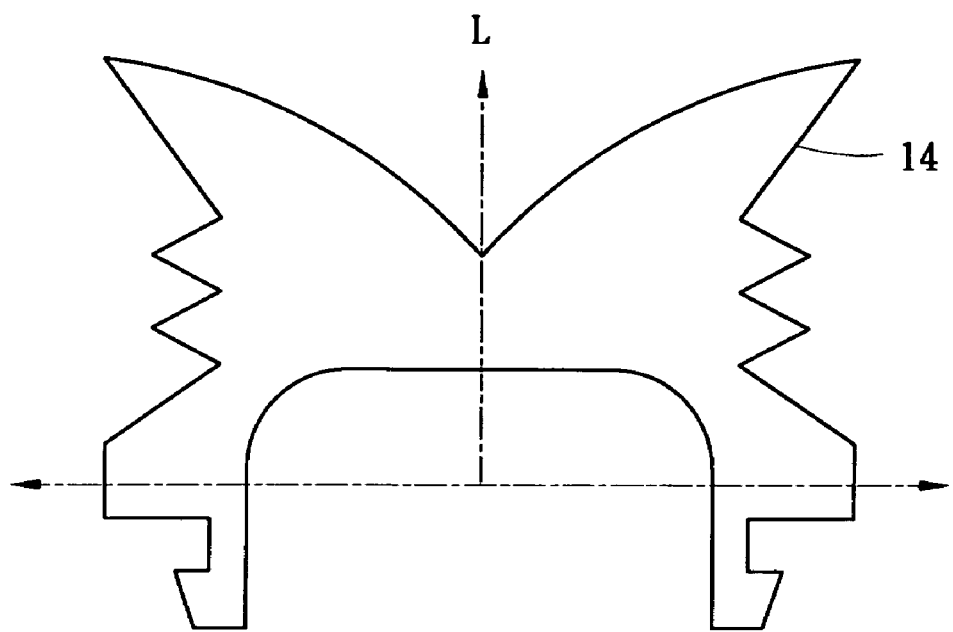
FIG. 2 is a diagram of the lens structure of a conventional side-emitting LED.
Figure 3:
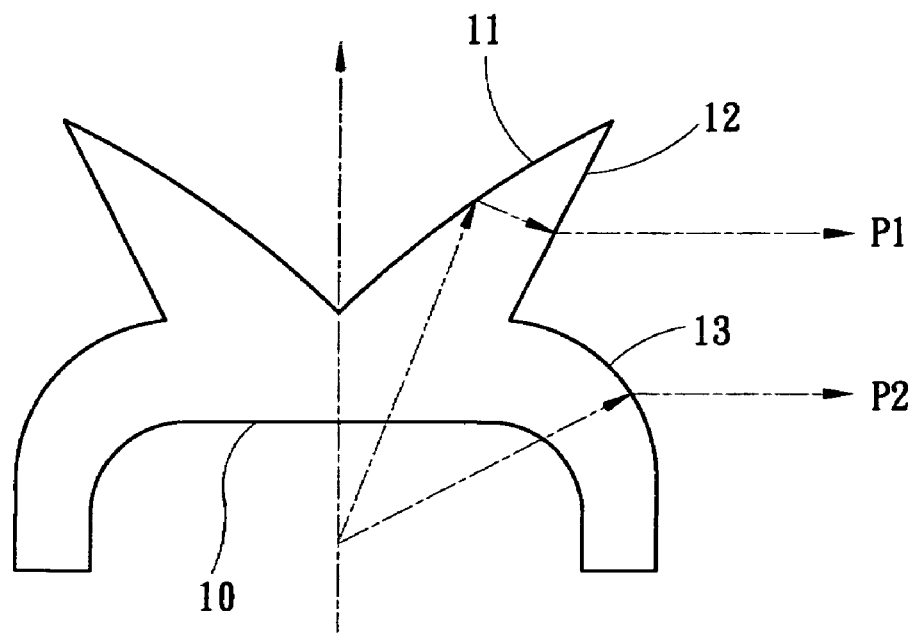
FIG. 3 is a diagram of the lens structure of another conventional side-emitting LED.

Please refer to FIG. 4A showing a packaging lens of the preferred embodiment according to the present invention. A profile of the packaging lens 20 is symmetrical with respect to an optical axis 0. Therefore, the structure in one side of the optical axis 0 is used for exemplifying the packaging lens 20 according to the present invention in the following description. In a preferred embodiment, the packaging lens 20 comprises an incident surface 21, a reflective surface 22, a first refractive surface 31 and a second refractive surface 32. The optical axis 0 passes through the incident surface 21. The reflective surface 22 is connected to the first refractive surface 31. The second refractive surface 32 is connected to the first refractive surface 31 and the incident surface 21. The reflective surface 22 is a surface of total internal reflection (TIR). The shape of the reflective surface 22 is designed to be that the reflective surface 22 reflects a light from a light source to proceed along a direction perpendicular to the optical axis 0, and then the reflected light vertically penetrates the first refractive surface 31. Refer to FIG. 4B. The first refractive surface 31 has many continuous zigzag surfaces. Each zigzag surface of the first refractive surface 31 has many refractive surfaces 311, 312 separately parallel or perpendicular to the optical axis 0 of the packaging lens 20, which enables the light reflected by the reflective surface 22 to vertically penetrate the first refractive surface 31 to proceed along a first optical path P1. As the reflective surface 22 is connected to a part of the first refractive surface 31 which is parallel to the optical axis 0. So that an intersectional angle contained by the reflective surface 22 and the first refractive surface 31 is increased, and thus, the structure of an intersection formed by the reflective surface 22 and the first refractive surface 31 is enhanced.

Figure 5:
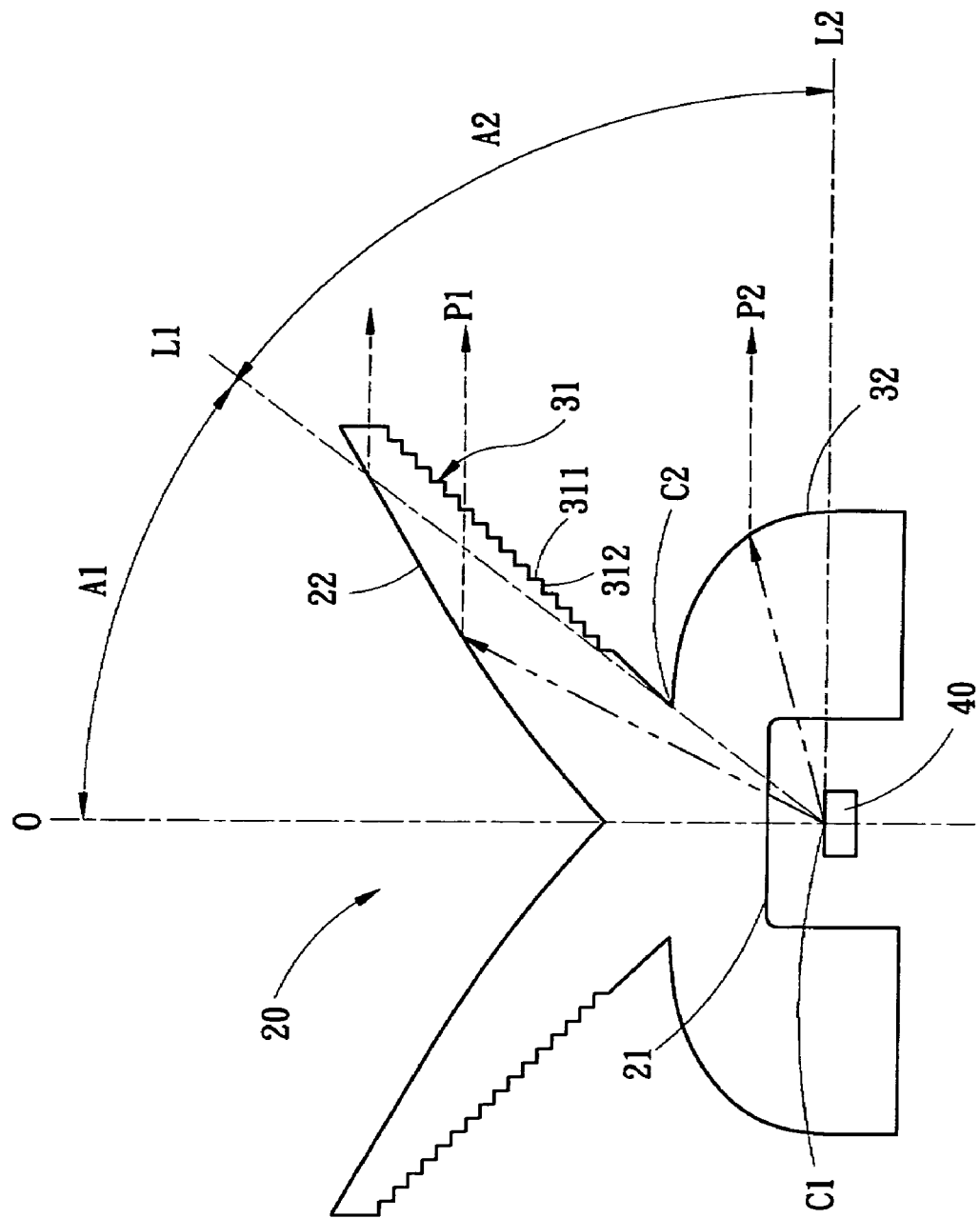
FIG. 5 is a diagram of the preferred embodiment of the side-emitting light-emitting element according to the present invention.

Refer to FIG. 5 showing a side emitting light-emitting element of the preferred embodiment according to the present invention. The side emitting light-emitting element includes a light-emitting element and the packaging lens 20. According to the preferred embodiment of the present invention, the light-emitting element is a light-emitting diode (LED), such as a LED chip 40, and the LED chip 40 is disposed below the incident surface 21. After a light from the LED chip 40 enters into the packaging lens 20 through the incident surface 21, the light distribution region is divided into a first sector A1 and a second sector A2 based on a light intensity. The first sector A1 is contained between the optical axis 0 and a line L1, and the second sector A2 is contained between the line L1 and a line L2. The line L1 is an extension line of a segment connecting a point C1 and a point C2. The point C1 is an intersecting point of the optical axis 0 and a central point of a surface of the LED chip 40, and the point C2 is an intersecting point of the first refractive surface 31 and the second refractive surface 32. The line L2 is a line passing through the point C1 and perpendicular to the optical axis 0. The light entering into the sector A1 is reflected by the reflective surface 22 to proceed along the direction perpendicular to the optical axis 0, the first optical path P1. The light entering into the sector A2 is refracted by the second refractive surface 32 and then keep on proceeding along an optical path P2 of the side surface of the packaging lens 20.

Figure 6A:
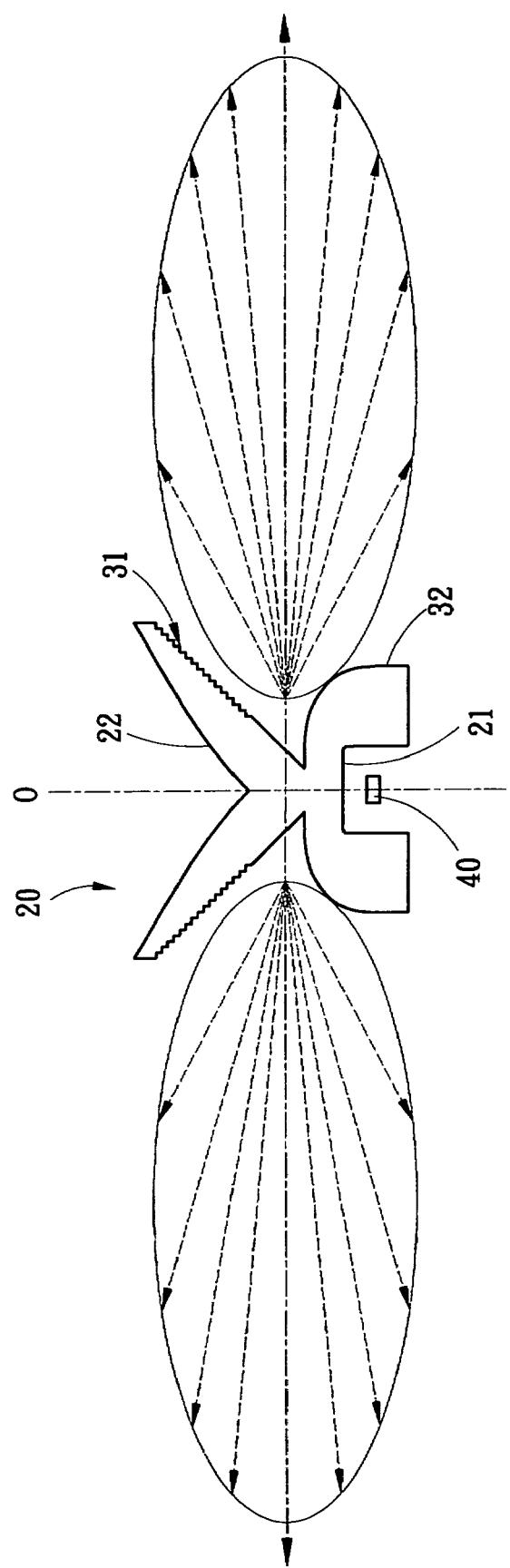
FIG. 6A is a diagram showing a light distribution pattern of a side-emitting light-emitting element according to a preferred embodiment of the present invention.

After the light from LED chip 40 enters into the interior of the packaging lens 20 through the incident surface 21, a portion of the light is reflected by the reflective surface 22 via total internal reflection to proceed along a horizontal direction, i.e. a direction perpendicular to the optical axis 0. Thus, the light is incident vertically the optical axis-paralleling refractive surfaces 311 of the first refractive surface 31 along the first optical path P1. The other portion of the light is incident the second refractive surface 32 to be refracted by the second refractive surface 32 along the second optical path P2. The second optical path P2 is parallel to the first optical path P1 and the propagation directions thereof are preferred to be about perpendicular to the optical axis 0 so that the light form LED chip 40 is emitted from the side surface of the packaging lens 20. Referring to FIG. 1A, the light energy emitted from LED chip 40 is Lambert's energy distribution. Refer to FIG. 6A. the energy intensity in the first sector A1 is greater than the energy intensity in the second sector A2. After the light is processed by the packaging lens 20 and is emitted from the side surface of the packaging lens 20, the light distribution pattern is more convergent. Thus the efficiency of light concentration is enhanced.

Figure 6B:
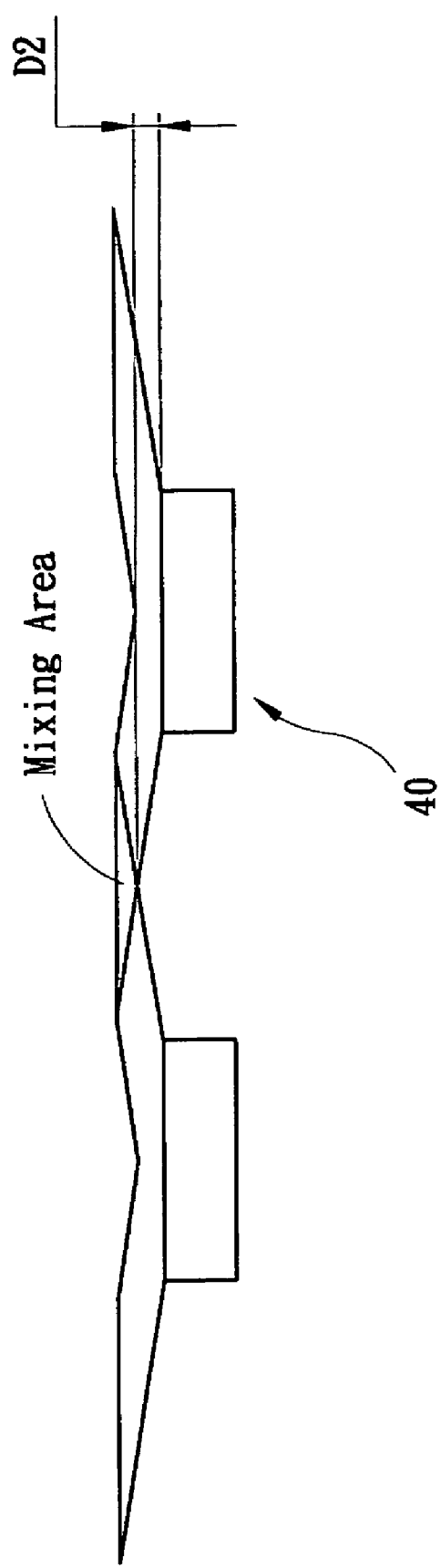
FIG. 6B is a diagram showing a light distribution in mixing optical properties of multiple side-emitting light-emitting elements according to the present invention.

The packaging lens 20 according to the present invention is applied to the packaging structure of LED chip 40 and is further used in a backlight module and a general illuminator. Especially, in the application of multiple LED chips 40, as the light distribution pattern of a single LED chip 40 is flattened, an invalid distance D2 is shortened obviously as shown in FIG. 6B. Further, the influence resulting from the variation of light-emitting efficiencies of different LED chips 40 is reduced.

Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A packaging lens, adapted for guiding a light entering into said packaging lens along an optical axis of said packaging lens to be emitted from side surfaces of said packaging lens, comprising:
   an incident surface, being passed through by said optical axis;
   a reflective surface, reflecting a portion of said light entering into said packaging lens through said incident surface to proceed along a direction perpendicular to said optical axis;
   a first refractive surface, having multiple continual zigzag surfaces, and said zigzag surface having multiple refractive surfaces separately parallel or perpendicular to said optical axis to enable said portion of said light reflected by said reflective surface to vertically penetrate said first refractive surface and then to proceed along a first optical path; and
   a second refractive surface, refracting the other portion of said light entering into said packaging lens through said incident surface to emit from said side surfaces of said packaging lens and then proceed along a second optical path.

2. The packaging lens according to claim 1, wherein said reflective surface reflects said portion of said light via total internal reflection (TIR).

3. The packaging lens according to claim 1, wherein said first optical path is parallel to said second optical path.

4. The packaging lens according to claim 3, wherein said first optical path and said second optical path are perpendicular to said optical axis.

5. The packaging lens according to claim 1, wherein said reflective surface is connected to said first refractive surface, and said second refractive surface is connected to said first refractive surface and said incident surface.

6. The packaging lens according to claim 1, wherein said reflective surface is connected to one said refractive surface of said first refractive surface being parallel to said optical axis.

7. A side-emitting light-emitting element, comprising:
   a light-emitting element, providing a light source; and
   a packaging lens, having an optical axis, and further comprising:
   an incident surface, being passed through by said optical axis and disposed above said light-emitting element;
   a reflective surface, reflecting a portion of said light entering into said packaging lens through said incident surface to proceed along a direction perpendicular to said optical axis;

a first refractive surface, having multiple continual zigzag surfaces, and said zigzag surface having multiple refractive surfaces separately parallel or perpendicular to said optical axis to enable said light reflected by said reflective surface to vertically penetrate said first refractive surface and then to proceed along a first optical path; and a second refractive surface, refracting the other portion of said light entering into said packaging lens through said incident surface to emit from side surfaces of said packaging lens and then proceed along a second optical path.

8. The side-emitting light-emitting element according to claim 7, wherein said light-emitting element is a light-emitting diode chip.

9. The side-emitting light-emitting element according to claim 7, wherein said reflective surface reflects the portion of said light via total internal reflection (TIR).

10. The side-emitting light-emitting element according to claim 7, wherein said first optical path is parallel to said second optical path.

11. The side-emitting light-emitting element according to claim 10, wherein said first optical path and said second optical path are perpendicular to said optical axis.

12. The side-emitting light-emitting element according to claim 7, wherein said reflective surface is connected to said first refractive surface, and said second refractive surface is connected to said first refractive surface and said incident surface.

13. The side-emitting light-emitting element according to claim 7, wherein said reflective surface is connected to said refractive surface of said first refractive surface being parallel to said optical axis.

* * * * *